(12) United States Patent
Hanchate et al.

(10) Patent No.: US 11,348,511 B2
(45) Date of Patent: May 31, 2022

(54) ENABLING A CHIPSET THAT SUPPORTS A SINGLE DISPLAY TO SUPPORT DUAL DISPLAY

(71) Applicant: Intel Corporation, Santa Clara, CA (US)

(72) Inventors: Mallari C. Hanchate, Bangalore (IN); Ganesh R. S.T., Bangalore (IN); Bharath Kumar, Bangalore (IN); Sameer Kp, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 1316 days.

(21) Appl. No.: 15/090,911

(22) Filed: Apr. 5, 2016

(65) Prior Publication Data

US 2016/0372027 A1 Dec. 22, 2016

(30) Foreign Application Priority Data

Jun. 19, 2015 (IN) ............................ 3090/CHE/2015

(51) Int. Cl.
*G09G 3/20* (2006.01)
*G09G 3/34* (2006.01)
*G06F 3/14* (2006.01)
*G09G 5/00* (2006.01)

(52) U.S. Cl.
CPC ......... *G09G 3/2096* (2013.01); *G06F 3/1431* (2013.01); *G09G 3/3406* (2013.01); *G09G 5/006* (2013.01); *G09G 2300/026* (2013.01); *G09G 2320/064* (2013.01); *G09G 2330/021* (2013.01); *G09G 2370/10* (2013.01); *G09G 2370/20* (2013.01)

(58) Field of Classification Search
CPC .. G09G 3/2096; G09G 3/3406; G06F 3/1431; G06F 3/147
See application file for complete search history.

(56) References Cited

U.S. PATENT DOCUMENTS

| 7,271,802 | B2 | 9/2007 | Wang et al. | |
|---|---|---|---|---|
| 2004/0252096 | A1* | 12/2004 | Wang | G09G 3/3208 345/102 |
| 2010/0141633 | A1 | 6/2010 | Goder | |
| 2012/0317607 | A1* | 12/2012 | Wyatt | G09G 5/006 725/127 |
| 2013/0207943 | A1* | 8/2013 | Imai | G09G 3/001 345/204 |
| 2014/0210697 | A1 | 7/2014 | Hussain et al. | |

(Continued)

OTHER PUBLICATIONS

PCT Search Report and Written Opinion in corresponding PCT application No. PCT/US2016/035321 filed Jun. 1, 2016 (12 pages).

*Primary Examiner* — Kent W Chang
*Assistant Examiner* — Chayce R Bibbee
(74) *Attorney, Agent, or Firm* — Trop, Pruner & Hu, P.C.

(57) ABSTRACT

Two extended embedded Display Port displays may be enabled by using a single set of panel power sequencing (PPS) signals from a chipset to enable the two embedded Display Port panels. To enhance the user experience, the backlight module brightness is controlled by making use of a pin available on a system on a chip (SOC) and modification of drivers. This helps to save power when only one panel is used. When both panels are used simultaneously, power savings can be achieved by using backlight control signals.

25 Claims, 7 Drawing Sheets

(56) References Cited

U.S. PATENT DOCUMENTS

2014/0307011 A1 10/2014 Ninan et al.
2015/0130850 A1* 5/2015 Wyatt .................... G09G 3/342
345/690

* cited by examiner

ENABLING A CHIPSET THAT SUPPORTS A SINGLE DISPLAY TO SUPPORT DUAL DISPLAY

CROSS-REFERENCE TO RELATED APPLICATIONS

This application claims priority of Indian Patent Application No. 3090/CHE/2015 filed on Jun. 19, 2015.

BACKGROUND

This relates generally to computer systems that have two displays.

For a variety of reasons, a system may have two displays, including a conventional display and an embedded display that may be embedded on the surface of a laptop keyboard for example. An example of one reason for such an arrangement is that an end user may prefer one type of display for reading a book and a different display for another function such as gaming. For example, one display may be part of a scan matrix and track pad of a laptop computer. However, other dual display embodiments are also contemplated.

Often times the hardware supplied with a given computer system and, particularly a central processing units and associated chipsets, are only adapted for a single display which is typically an external internal display.

This may not be an issue with some technologies but with embedded Display Port (eDP) technologies, a number of control signals are needed. See Embedded Display Port Specification, version 1.4 (2012) available from Video Electronics Standards Association (VESA). If the chipset does not produce those control signals, absent additional hardware, typically the system will not support two embedded Display Port displays.

One solution is to provide an additional controller to operate the additional display. But this results in all kinds of complexities in coordinating with the embedded controller and necessarily involves additional hardware costs.

BRIEF DESCRIPTION OF THE DRAWINGS

Some embodiments are described with respect to the following figures.

DETAILED DESCRIPTION

Two extended embedded Display Port displays may be enabled by using a single set of panel power sequencing (PPS) signals from a chipset to enable the two embedded Display Port panels. To enhance the user experience, the backlight module brightness is controlled by making use of a pin available on a system on a chip (SOC) and modification of drivers. This helps to save power when only one panel is used. When both panels are used simultaneously, power savings can be achieved by using backlight control signals.

Specifically existing PPS signals for the panel and backlight enable may be reused for both displays. Two different pulse width modulated (PWM) control signals are used to enable the backlight module during boot-up.

Figure 1:
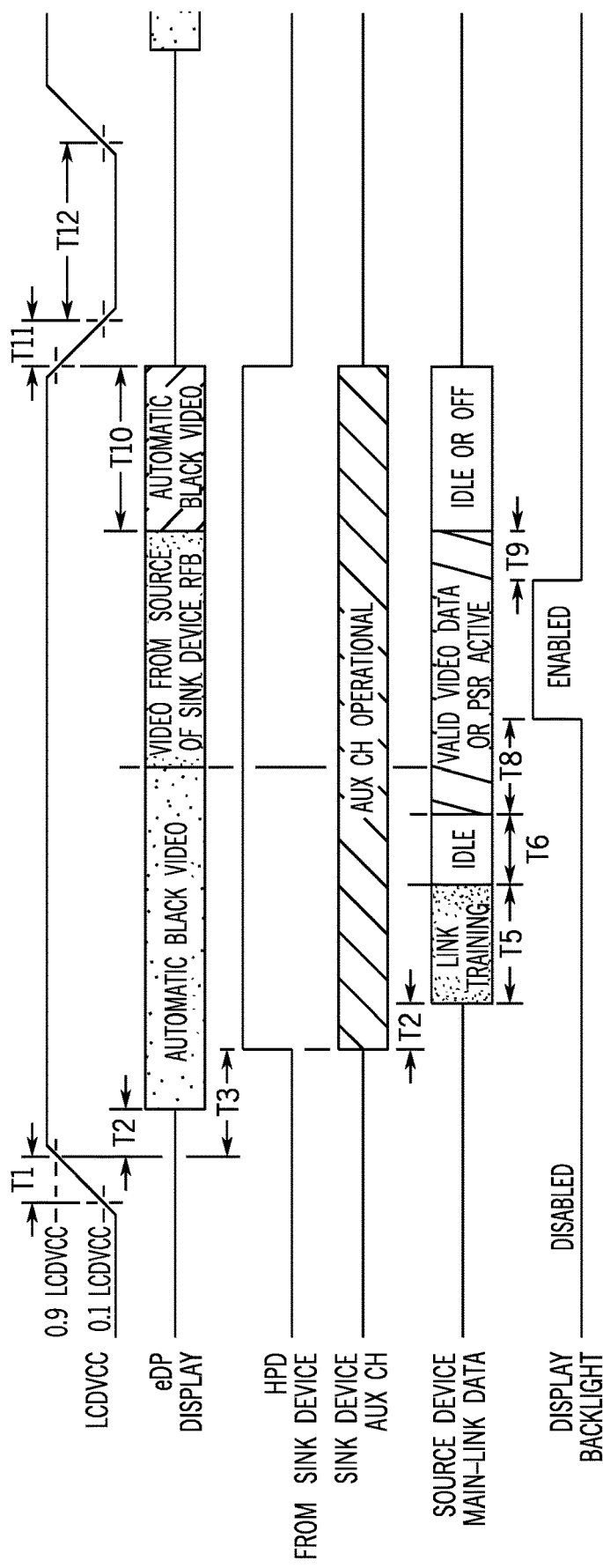
FIG. 1 is an embedded Display Port panel power sequencing timing diagram according to one embodiment.

As shown in FIG. 1, a panel power sequencing signals are important for operating within the embedded Display Port specification. All embedded display panels may align to the embedded Display Port (eDP) specification and follow the power up and down sequencing requirements as shown in FIG. 1. The LCDVCC signal is a panel input power enable that powers a timing controller inside the panel and other embedded Display Port logic such as the main link and the auxiliary channel (AUX CH). The HPD channel is hot plug detect. BKLT_EN is the enable backlight power and BKLT_CNTRL is a pulse width modulated control signal that controls the brightness of the panel by controlling the backlight source. This may be used in a way that reduces power consumption.

Timing parameters are as follows:

TABLE 1.1 eDP power sequence Timing requirements

| Timing Parameter | Description | Notes |
|---|---|---|
| T1 | Power rail rise time, 10% to 90% | |
| T2 | Delay from LCDVCC | Automatic Black Video generation prevents display noise until valid video data is received from the Source device. |
| T3 | Delay from LCDVCC to HPD high | Sink device AUX CH must be operational upon HPD high. |
| T4 | Delay from HPD high to Link Training initialization | Allows for the Source device to read Link capability and initialize. |
| T5 | Link Training duration | Dependent on the Source device Link Training protocol. |
| T6 | Link idle | Min value accounts for required BS symbol sequence-Idle Pattern. Max value allows for Source device frame synchronization. |
| T7 | Delay from valid video data from Source device to video on display | Max value allows for the Sink device to validate video data and timing. At the end of T7, the Sink device will indicate that it detected valid video data. |
| T8 | Delay from valid video data from Source device to backlight enable | The Source device must assure display video is stable. |

TABLE 1.1-continued eDP power sequence Timing requirements

| Timing Parameter | Description | Notes |
| --- | --- | --- |
| T9 | Delay from backlight disable to end of valid video data | The Source device must assure that the backlight is no longer illuminated. At the end of T9, the Sink device will indicate that it did not detect valid video data. |
| T10 | Delay from end of valid video data from the Source device to power-off | |
| T11 | Power rail fall time, 90% to 10% | |
| T12 | Power-off time | |

There is only one native port in embedded Display Port in some chipsets including those available from Intel Corporation, Santa Clara, Calif., USA. Hence anyone of the available two Display Data Interface (DDI) ports may be used to support the dual embedded Display Port acting as a source of the pixels for the second DDI port. If the existing chipset only supports one embedded Display Port natively, this also means there is only one set of PPS signals available. To meet the power requirements to power up and down, of the second embedded Display Port panel according to FIG. 1, these signals must be obtained from some other source.

Figure 2:
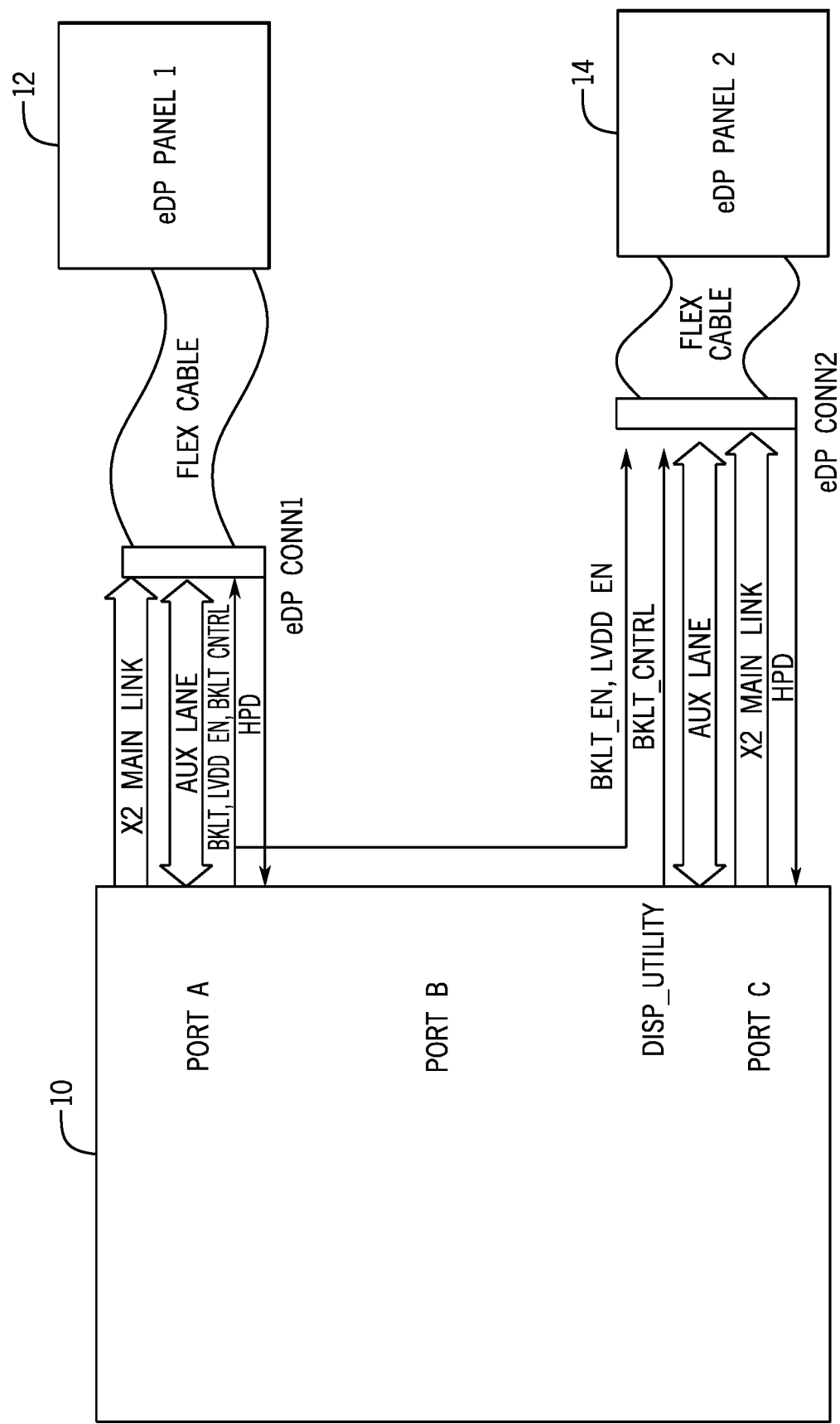
FIG. 2 is a hardware schematic for one embodiment.
Figure 3:
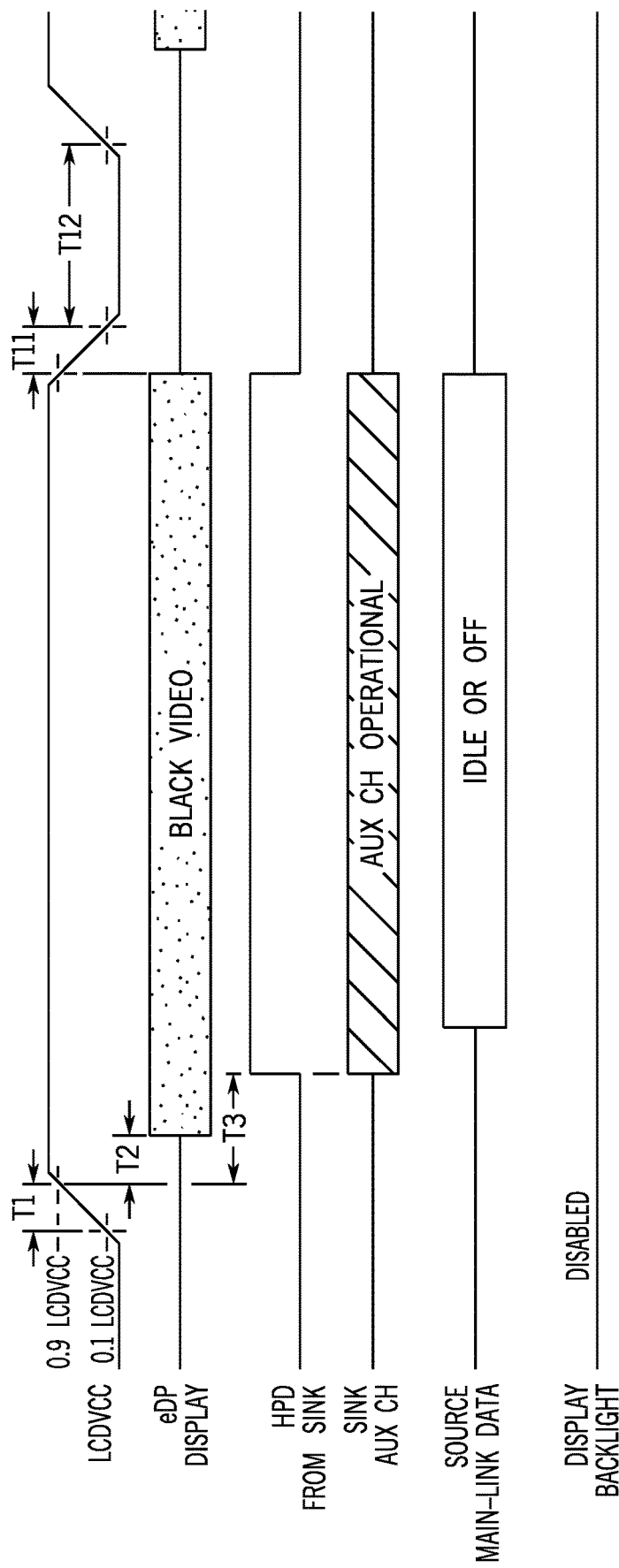
FIG. 3 is an embedded Display Port timing specification according to one embodiment.

According to one embodiment, the backlight enable (BKLT) and LCDVCC enable signals from the chipset 10 to the first panel 14 may be shared with the second panel 12 as shown in FIG. 2. Thus, as shown, the backlight signal BKLT is also ported for the second panel 14. The backlight control signal (BKLT_CNTRL) may be reserved only for the first panel 12.

Thus the chipset 10 supplies the backlight signal and the LCDVCC enable signal to both panels 12 and 14. Hence, the first panel uses the native BKLT_CNTRL control signal for brightness control. The second panel 14 can use a pulse width modulated signal from the chipset 10 (e.g. DISP_UTILITY) for controlling brightness of the second panel so that it has a more efficient panel control mechanism.

Sharing the PPS signals up to the T3 stage of the sequence shown in FIG. 1 means that it is possible that the sequence of both panels continues concurrently, until time parameter T3. Then the further operations may continue sequentially. However, this is not issue as an embedded Display Port panel allows the source to continue until parameter T3 and turn off the panel.

Figure 4:
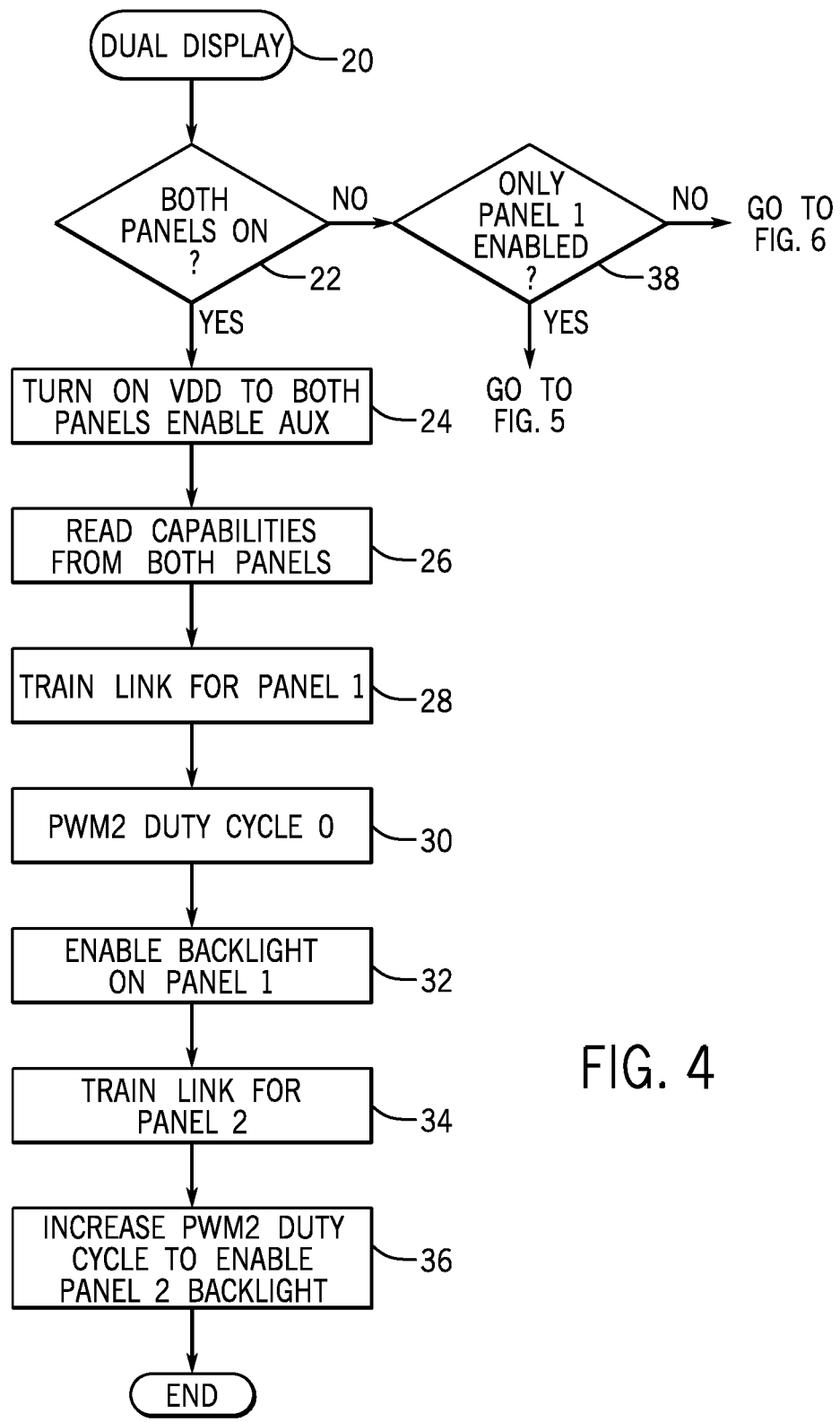
FIG. 4 is a flow chart for one embodiment.

FIG. 4 shows a dual display sequence 20 which may be implemented in software, firmware and/or hardware. In software and firmware embodiments it may be implemented by computer executed instructions stored in one or more non-transitory computer readable media such as magnetic, optical, or semiconductor storage. In one embodiment it may be implemented by the chipset 10.

The sequence 20 begins by determining whether both panel 1 and panel 2 are on, at diamond 22. If so, the power supply VDD is turned on to both panels and the auxiliary channel is enabled as indicated in block 24. Then the panel capabilities are read from both panels, as indicated in block 26. Next the link for the panel 1 is trained, as indicated in block 28.

Thereafter the duty cycle for the second panel is set to zero (block 30) so that the backlight is not enabled when there is no display on the screen. Seeing backlighting with no displayed content might be disconcerting for some end users.

Then, as indicated in block 32, the backlight is enabled on panel 1 which will be the first to display. Next the link for panel 2 is trained at block 34. Thereafter the pulse width modulated duty cycle for panel 2 may be increased (block 36) to enable panel 2 backlighting, now that the link for panel 2 has been trained in block 34. Note the sequential link training, since this occurs after time parameter T3.

Figure 5:
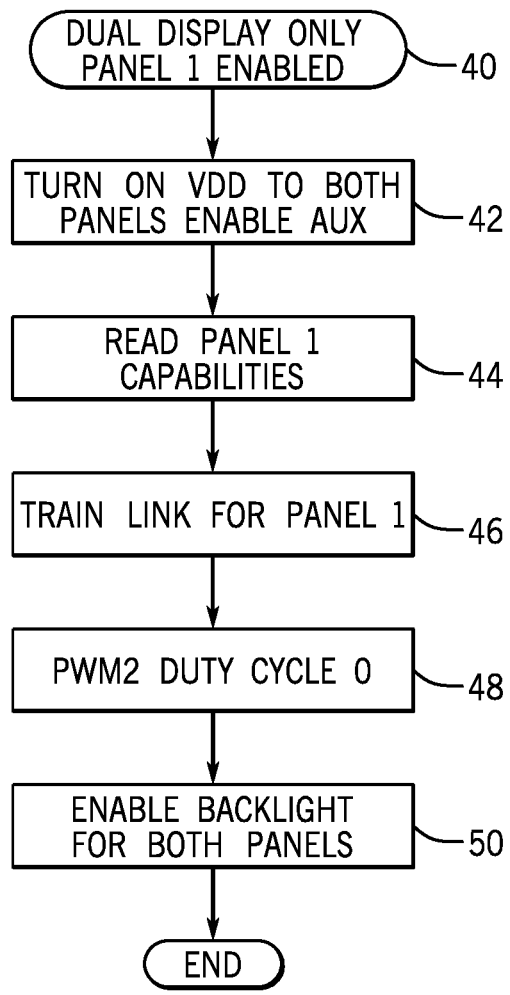
FIG. 5 is a continuation of the flow chart of FIG. 4.

If only one panel is enabled, as determined in diamond 38, in FIG. 4, then the flow continues at FIG. 5 and the sequence 40 therein. If only panel 1 is enabled, then the power supply VDD is turned on to both panels and the auxiliary channel is enabled as indicated in block 42. Next, the panel 1 capabilities are read as shown in block 44, and the link training for panel 1 is done as indicated in block 46.

Thereafter, the PWM signal for panel 2 has its duty cycle reduced to zero to avoid backlighting without picture as indicated in block 48. Then the backlight for both panels is enabled as indicated in block 50. For panel 1 this means that the backlight gets enabled; for panel 2 this means that the backlight gets enabled but the backlight remains black because the duty cycle is zero.

Figure 6:
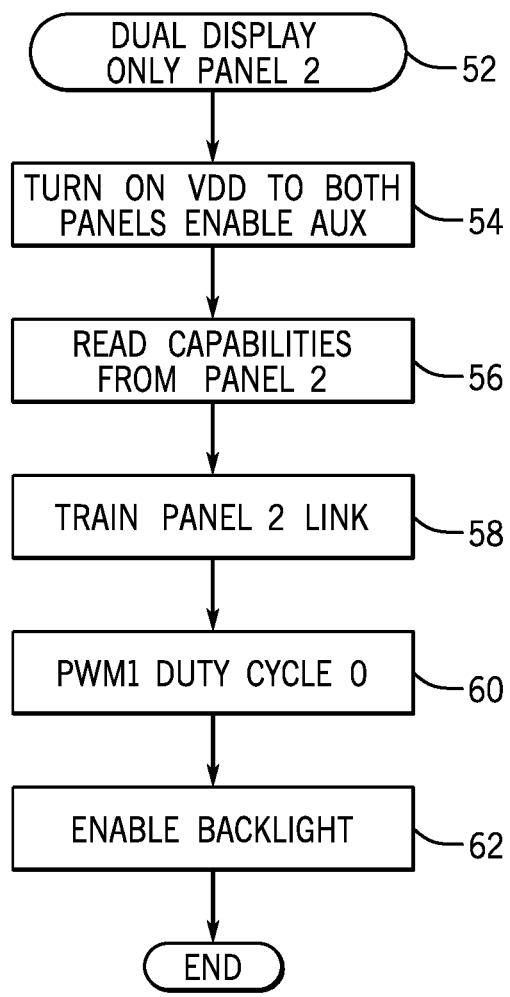
FIG. 6 is a continuation of the flow chart of FIG. 4.

The flow of FIG. 4 continues to the sequence 52 of FIG. 6 if and when only panel 2 is enabled. In this case, the power supply is turned on to both panels and the auxiliary channel is again enabled as indicated in block 54. Because only panel 2 is being used, the capabilities for panel 2 are read as indicated in block 56 and panel 2 link is trained as indicated in block 58.

In this case, the duty cycle of the pulse width modulated signal for panel 1 is set to zero as indicated in block 60. The backlight is then enabled as indicated in block 62. This means that the backlighting will be effective on panel 2 and is on at panel 1 but panel 1 has no duty cycle and therefore does not generate any backlight.

Figure 7:
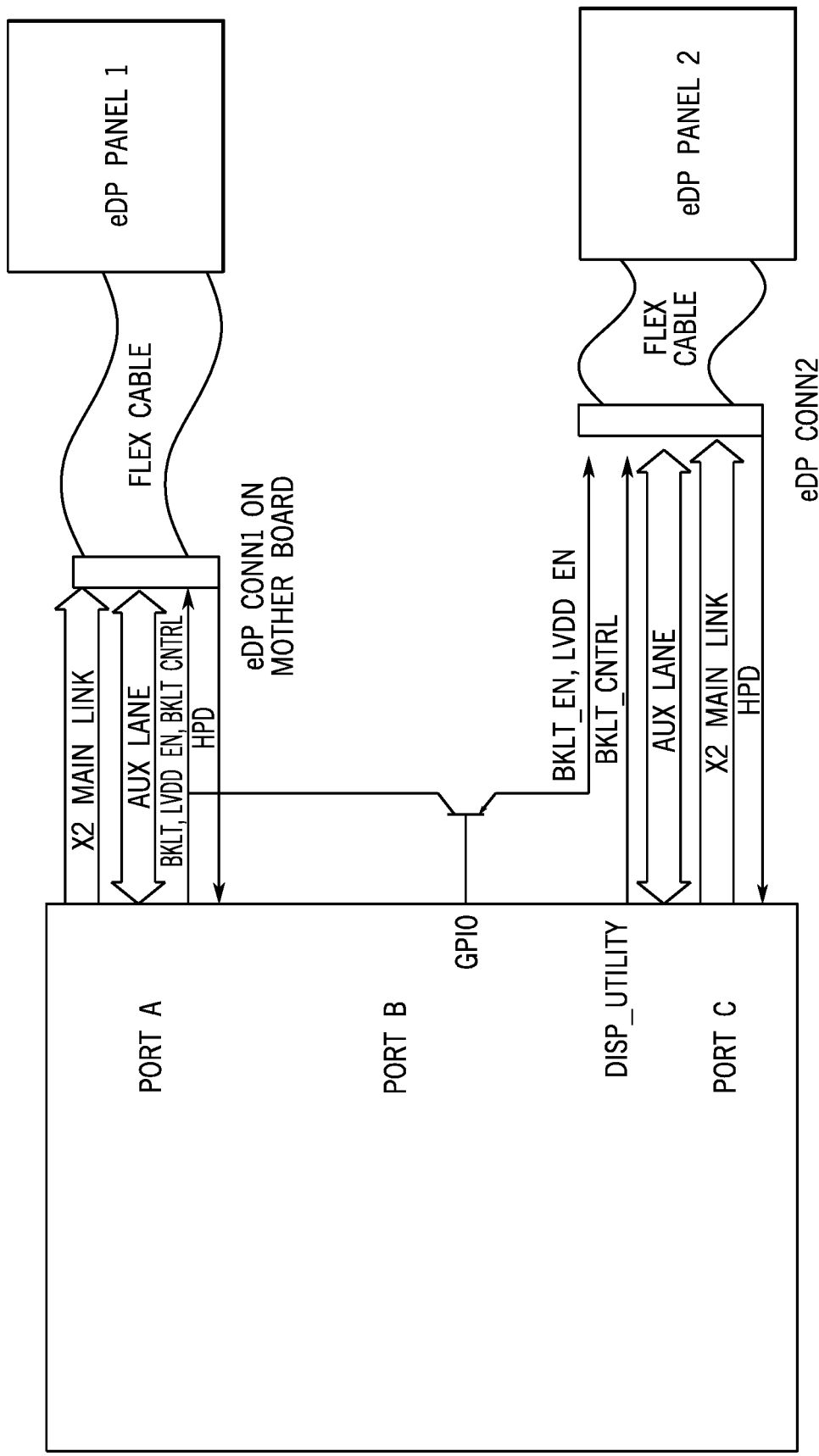
FIG. 7 is a hardware depiction for another embodiment.

The backlight boost goes into its lowest power consumer mode if the backlight controller pulse width modulated signal its programmed to zero duty cycle in the case of a single panel usage case. To attain greater power savings, an additional modification may be implemented as indicated in FIG. 7. A general purpose input/out (GPIO) pin that may be available with some chipsets may be used for this purpose. Two GPIO control signals may be used to control the LCDVCC_EN and BKLT_EN signals from port A (panel 1) to port C (panel 2) through a switch 64, such as field effect transistor, as shown in FIG. 7. This switch may totally turn off the power to the second unused panel.

The following clauses and/or examples pertain to further embodiments:

One example embodiment may be a method comprising operating two Display Port panels directly from one chipset by sharing backlight and power enable signals from the chipset with both panels, and causing a backlight to one of said panels to be turned off. The method may include wherein turning off the backlight of one panel includes setting its duty cycle to zero. The method may include wherein turning off the backlight of one panel indicates operating a switch to turn off said backlight. The method may include successively link training each panel. The method may include increasing the duty cycle when the one panel is used for display. The method may include selectively enabling simultaneous display on both panels or display on either but not both of said panels. The method may include wherein the chipset produces only one backlight brightness control signal, using said signal for only one panel. The method may include using a pulse width modulated signal from said chipset as a backlight control signal for the other panel.

In another example embodiment may include one or more non-transitory computer readable media storing instructions executed by a hardware processor to perform a sequence comprising operating two Display Port panels directly from one chipset by sharing backlight and power enable signals from the chipset with both panels, and causing a backlight to one of said panels to be turned off. The media may include wherein turning off the backlight of one panel includes setting its duty cycle to zero. The media may include wherein turning off the backlight of one panel indicates operating a switch to turn off said backlight. The media may include wherein said sequence includes successively link training each panel. The media may include wherein said sequence includes increasing the duty cycle when the one panel is used for display. The media may include wherein said sequence includes selectively enabling simultaneous display on both panels or display on either but not both of said panels. The media may include wherein the chipset produces only one backlight brightness control signal, using said signal for only one panel. The media may include wherein said sequence includes using a pulse width modulated signal from said chipset as a backlight control signal for the other panel.

Another example embodiment may be an apparatus comprising a chipset to directly operate two Display Port panels by sharing backlight and power enable signals from the chipset with both panels, and causing the backlight to one of said panels to be turned off, and a storage coupled to said chipset. The apparatus may include wherein turning off the backlight of one panel includes setting its duty cycle to zero. The apparatus may include wherein turning off the backlight of one panel indicates operating a switch to turn off said backlight. The apparatus may include said chipset to successively link train each panel. The apparatus may include said chipset to increase the duty cycle when the one panel is used for display. The apparatus may include said chipset to selectively enable simultaneous display on both panels or display on either but not both of said panels. The apparatus may include wherein the chipset produces only one backlight brightness control signal, using said signal for only one panel. The apparatus may include said chipset to use a pulse width modulated signal from said chipset as a backlight control signal for the other panel. The apparatus may include a pair of display panels, one of which is embedded.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   operating first and second Display Port panels directly from one chipset by sharing backlight and power enable signals from the chipset with both panels;
   causing a backlight to both panels to be turned off while training a link for the first panel;
   after training the link for the first panel, turning on the backlight for the first panel; and
   after training a link for the second panel turning on the backlight for the second panel.

2. The method of claim 1 wherein turning off the backlight of one panel includes setting its duty cycle to zero.

3. The method of claim 1 wherein turning off the backlight of one panel indicates operating a switch to turn off said backlight.

4. The method of claim 1 including successively link training each panel.

5. The method of claim 2 including increasing the duty cycle when the one panel is used for display.

6. The method of claim 1 including selectively enabling simultaneous display on both panels or display on either but not both of said panels.

7. The method of claim 1 wherein the chipset produces only one backlight brightness control signal, using said signal for only one panel.

8. The method of claim 7 including using a pulse width modulated signal from said chipset as a backlight control signal for the other panel.

9. One or more non-transitory computer readable media storing instructions executed by a hardware processor to perform a sequence comprising:
   operating first and second Display Port panels directly from one chipset by sharing backlight and power enable signals from the chipset with both panels;
   causing a backlight to one of said both panels to be turned off while training a link for the first panel;
   after training the link for the first panel, turning on the backlight for the first panel; and
   after training a link for the second panel turning on the backlight for the second panel.

10. The media of claim 9 wherein turning off the backlight of one panel includes setting its duty cycle to zero.

11. The media of claim 9 wherein turning off the backlight of one panel indicates operating a switch to turn off said backlight.

12. The media of claim 9 wherein said sequence includes successively link training each panel.

13. The media of claim 10 wherein said sequence includes increasing the duty cycle when the one panel is used for display.

14. The media of claim 9 wherein said sequence includes selectively enabling simultaneous display on both panels or display on either but not both of said panels.

15. The media of claim 9 wherein the chipset produces only one backlight brightness control signal, using said signal for only one panel.

16. The media of claim 15 wherein said sequence includes using a pulse width modulated signal from said chipset as a backlight control signal for the other panel.

17. An apparatus comprising:
a chipset to directly operate first and second Display Port panels by sharing backlight and power enable signals from the chipset with both panels, cause the backlight to both panels to be turned off while training a link for the first panel, after training the link for the first panel, turn on the backlight for the first panel, and after training a link for the second panel turn on the backlight for the second panel; and
a storage coupled to said chipset.

18. The apparatus of claim 17 wherein turning off the backlight of one panel includes setting its duty cycle to zero.

19. The apparatus of claim 17 wherein turning off the backlight of one panel indicates operating a switch to turn off said backlight.

20. The apparatus of claim 17, said chipset to successively link train each panel.

21. The apparatus of claim 18, said chipset to increase the duty cycle when the one panel is used for display.

22. The apparatus of claim 17, said chipset to selectively enable simultaneous display on both panels or display on either but not both of said panels.

23. The apparatus of claim 17 wherein the chipset is to produce only one backlight brightness control signal, using said signal for only one panel.

24. The apparatus of claim 23, said chipset to use a pulse width modulated signal from said chipset as a backlight control signal for the other panel.

25. The apparatus of claim 17 including a pair of display panels, one of which is embedded.

\* \* \* \* \*

UNITED STATES PATENT AND TRADEMARK OFFICE
CERTIFICATE OF CORRECTION

| | |
|---|---|
| PATENT NO. | : 11,348,511 B2 |
| APPLICATION NO. | : 15/090911 |
| DATED | : May 31, 2022 |
| INVENTOR(S) | : Hanchate et al. |

It is certified that error appears in the above-identified patent and that said Letters Patent is hereby corrected as shown below:

In the Claims

Column 6:
Line 52, delete "one of said".

Signed and Sealed this
Fifth Day of July, 2022

Katherine Kelly Vidal
Director of the United States Patent and Trademark Office